United States Patent
Schemmann et al.

(10) Patent No.: US 6,583,906 B1
(45) Date of Patent: Jun. 24, 2003

(54) PRE-SHAPING LASER MODULATION SIGNALS TO INCREASE MODULATION INDEX

(75) Inventors: Marcel F. Schemmann, Echt (NL); Venkatesh G. Mutalik, Manlius, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,913

(22) Filed: Jun. 30, 1999

(51) Int. Cl.[7] ............................................. H04B 10/00
(52) U.S. Cl. ..................... 359/161; 359/173; 359/187; 359/188
(58) Field of Search ............................... 359/161, 173, 359/187, 188

(56) References Cited

U.S. PATENT DOCUMENTS

| | | | | |
|---|---|---|---|---|
| 4,941,208 A | * | 7/1990 | Olshansky et al. ......... | 359/132 |
| 5,003,624 A | * | 3/1991 | Terbrack et al. ............ | 359/181 |
| 5,689,356 A | * | 11/1997 | Rainal ......................... | 359/181 |
| 5,963,352 A | * | 10/1999 | Atlas et al. ................. | 359/161 |
| 6,014,241 A | * | 1/2000 | Winter et al. ............... | 359/187 |
| 6,163,395 A | * | 12/2000 | Nemecek et al. ........... | 359/161 |

* cited by examiner

Primary Examiner—Leslie Pascal
Assistant Examiner—Dzung Tran

(57) ABSTRACT

An in-line pre-shaper for a laser transmitter distorts an electronic information signal to compensate for distortions resulting from the optical information signal provided by the laser transmitter, being transmitted through an optical cable, as well as, compensating for distortions resulting from using the electronic information signal to modulate the laser beam produced by the laser transmitter to provide the optical information signal. The pre-compensation reduces both second order and third order distortion of the optical signal for the combination of the laser and the optical cable. Even though the optical signal is more distorted at the output of the laser transmitter, the optical signal that arrives at the receiver is less distorted.

23 Claims, 9 Drawing Sheets

PRE-SHAPING LASER MODULATION SIGNALS TO INCREASE MODULATION INDEX

FIELD OF THE INVENTION

The invention is related to the fields of broadband cable television systems and is most closely related to laser optical communication links for such systems.

BACKGROUND OF THE INVENTION

In a cable television system, television programs are provided at a central head-end. The programs are distributed from the head-end through optical fiber tree networks to multiple local nodes in respective communities, and then further distributed from the local nods through coaxial cable tree networks to customer interface units (CIUs) also called cable terminations. Currently, many of these systems are beginning to provide other communication services such as telephone service and/or computer networking services (e.g. internet connection) through the cable television system. Telephone and computer networking services require bi-directional communication in the cable television system. Forward communication signals are transmitted, as described above for television program signals from the head-end to the customer interface units, and return communication signals travel the same path in the opposite direction. The return signals are collected from the CIUs through the coaxial cable networks to the local nodes, and further collected from the local nodes through the optical fiber network to the head-end.

At the head-end, a multitude of electronic signals for the programs and other communication services are used to modulate respective carrier signals with different respective frequencies. The modulated carrier signals are combined together into an electronic forward signal that is used to modulate a laser beam to produce an optical forward signal. The modulated laser beam, carrying the optical forward signal, is transmitted through an optical fiber tree network to a multitude of local nodes. At each local node, an optical detector coverts the optical forward signal back into an electronic forward signal. Then the reconverted electronic forward signal is transmitted through a coaxial conductor tree network to CIUs at homes and businesses of customers.

Telephone systems and computer systems connected to the CIUs by customers, produce return communication signals that are transmitted by the CIUs into the coaxial network. The return signals are multi-carrier modulated signals similar to the forward signals. The return signals travel back through the coaxial network to the local nodes. In the local nodes the return signals are separated from the forward signals by diplex filters. The separated return signals are used to modulate a return laser beam to produce an optical return signal carried by the return laser beam. The optical return signal is transmitted through an optical fiber network to the head-end where the optical return signals are converted back into electronic return signals by an optical detector. The electronic return signals are demodulated and used for telephone and computer communications.

Laser diodes are used to produce the laser beams that are modulated to convert the electronic signals into optical signals at the head-end and at the local nodes. In a directly modulated laser diode, the intensity of the laser beam depends on the current applied to the laser diode. The laser produces a signal as long as the current through the diode is positive and above a cutoff current level for the diode. Below the cutoff current level, the intensity of the laser is non-linear and falls quickly to zero. The current through the laser diode is modulated so that a modulation signal is carried by the laser beam. In order to produce a continuous signal, that is not cut off every time the signal becomes negative, the modulation signal is biased (e.g. a bias current is modulated by the modulation signal) so that the intensity of the laser beam produced by the laser is continuously modulated and negative portions of the signal are not lost. The electronic information signal includes positive and negative excursions of amplitude and the extent of some of the excursions are larger than other excursions. The bias is set so that the minimum amplitude of the biased electronic signal during the largest negative excursions of the signal is equal or higher than the cutoff bias of the laser diode.

The modulation index is the ratio between the power of the modulation of the laser beam and the total power of the laser beam. Thus, the modulation index is a measure of the energy efficiency of the communication so that increasing the modulation index reduces the energy required for the optical communications. In addition it has been found that the signal to noise ratio (SNR) is approximately proportional to the modulation index.

In order to transmit information without loss, it is critical to maximize the SNR. There are strict specifications for minimum SNR for all types of communications equipment, and the SNR requirements limit the distance through which signals may be transmitted through optical fiber links and coaxial cable links to customers. Generally, the noise in each stage of the communication system is additive to reduce SNR.

Those skilled in the art are directed to U.S. Pat. No. 4,941,208 to Olshansky in which a multitude of signals modulated by carriers of different frequencies are combined into a multi-carrier signal in which the sum of the modulation indexes of the signals is greater than one.

The above references are hereby incorporated herein in whole by reference.

SUMMARY OF THE INVENTION

In the invention herein, at a first node, an output electronic information signal is used to modulate a laser beam resulting in an optical information signal that is transmitted through an optical fiber to another node where, an optical detector converts the optical information signal into an input electronic information signal. The output electronic information signal includes high frequency positive and negative excursions of with respect to an average amplitude of the signal, and the extent of some of the excursions are larger than other excursions.

Prior to modulating the laser beam, the output signal is preprocessed to improve the resulting optical information signal. The preprocessor includes pre-shaper that transforms the electronic information output signal to reduce the extent of the larger negative excursions, so that, the modulation index can be increased for increasing the signal to noise ratio and increasing the energy efficiency of the communications. The transformed output signal is biased so that the current level in the biased signal is generally above a predetermined current level (e.g. the cut off current level of a laser), and the biased transformed signal is used to modulate the laser beam to provide an optical information signal.

Preferably, the output signal is a multi-carrier signal including a multitude of carrier signals each of a different frequency and each modulated by a respective baseband information signal.

The transformation may be a simple clipping of large negative excursions which provided continuous output of the laser. Clipping of large positive excursions may provide reduced noise if the signal with such positive excursions that are distorted are more noisy than the clipped and approximately restored signals. If post shaping is provided, cut off peaks can be estimated based, for example, typical shapes of cut off excursions based on the width of the clipped portion and/or on the derivative of the signals to the beginning and end of the cut off portion. More preferably, the transformation is a function selected to minimize third order distortions due to using the output signal to modulate a laser beam and due to transmitting the modulated laser beam through an optic fiber. Preferably, the transfer function is a parabolic transfer function. Also, the modulation index can be further increased by selecting a transfer function which reduces the extent of larger positive excursions with respect to the other excursions in the output signal so as to further increase the modulation index and further reduce distortion and noise resulting from modulating the laser beam.

Preferably, parameters of the transformation are statically adjusted at the factory or during installation of the circuit or are dynamically modified during operation depending on parameters of the optical output signal either manually from a front panel or automatically depending on a feedback, for example, from a receiver that receives the output signal.

Transforming the signal induces second order distortion of the output signal during transmission through an optic fiber, so preferably, the frequencies of carriers for critical signals in the output signal are within a range of one octave, from a minimum frequency of $f_1$ to a maximum frequency of $f_2$ where $f_2<2*f_1$, so that second order distortion can be filtered out after the optical fiber transmission. Also, the transforming induces fourth order distortion of the output signal during transmission through an optical fiber, so preferably, the frequencies of carriers for critical signals in the output signal are within a range of half an octave, from a minimum frequency of $f_1$ to a maximum of frequency of $f_2$ where $f_2<1.5*f_1$, so that fourth order distortion can be filtered out after the optical fiber transmission. Also, preferably, the carrier frequencies of critical signals are between approximately 550 and 750 MHz in a CATV network.

Preferably, the preprocessor also includes a pre-compensating circuit for compensating for distortions in the communication system. The pre-compensating circuit should be an in-line compensating circuit so that high frequency signals can be processed. The pre-compensating circuit distorts the output signal to compensate for odd order distortions due to dispersion when transmitting the laser beam through an optical fiber. The pre-compensating circuit also distorts the output signal for compensating for odd order distortions due using the output signal to modulate a laser beam.

Even when second and fourth order distortions are filtered out, preferably, the pre-compensator circuit also compensates for even order distortions especially sixth and higher even order distortions. These even order distortions may be due to using the output signal to modulate the laser beam and due to dispersion when transmitting the modulated laser beam through the optical fiber. The pre-compensator circuit also compensates for distortions due to receiving the output signal from the modulated laser beam with a photo-detector and due to amplifying the information signal. For example, the optical output signal can be amplified using an dope fiber optical amplifier and the output and input electronic signals can be amplified using preamplifiers and power amplifiers.

A optical transmitter of the invention is defined by the pre-processor together with, a biaser to bias the output signal so that the minimum amplitude is higher than a predetermined minimum positive amplitude of the output signal current, a laser to produce a laser beam, apparatus for modulating the laser beam with the output signal, and apparatus for directing the laser beam into the end of an optical.

Preferably, the laser is a directly modulated laser so that the laser and the means for modulating the laser beam are integral, and the predetermined minimum positive amplitude corresponds approximately with the cutoff amplitude of the directly modulated laser. The inventions described in this application are especially useful for distributed feedback type laser diode. Such a laser can be directly modulated by the bias current.

Preferably, a multitude of signal inputs are provided for respective baseband signals and the baseband signals are modulated and combined to form a output signal. Modulators are used for modulating respective carrier signals with each baseband signal. The frequencies of the carrier signals are different so that the modulated carrier signals can be combined and then separated using a tuner. A combiner may be used for combining the multitude of carrier signals from different respective conductors into a output signal in a single conductor.

Preferably, the bias level provided by the biaser is adjusted at the factory or manually during installation or more preferably is adjusted dynamically during operation depending on parameters of the optical output signal, either manually from the front panel or automatically depending on a feedback for example from a receiver that receives the optical signal.

Preferably, the transmitter includes an amplifier for amplifying the output signal prior to using the output signal for modulating the laser beam, and the transmitter includes an optical lens system through which the laser beam travels between the laser and the proximate end of the optical fiber.

When the optical signal reaches the other node it is converted into an input electronic signal. In the other node, the input signal is provided to a signal post-processor that includes a post-shaper for reforming the input signal to approximately duplicate the output signal prior to transforming the output signal to increase the modulation index, modulating a laser beam with the transformed signal, transmitting the modulated laser beam through an optical fiber, and converting the laser beam into the electronic input signal. The input signal is a high frequency electronic signal with positive and negative excursions in amplitude with respect to an average amplitude with the extent of some excursions being larger than other excursions. The reforming includes increasing the extent of larger negative excursions with respect to other excursions. The input signal is then provided to the other node through an output for the reformed signal.

Preferably, the input signal is a multi-carrier signal including a multitude of carrier signals each of a different frequency and each modulated by a respective baseband information signal. The post-shaper is also adapted for increasing the extent of larger positive excursion with respect to the other excursions in the input signal. In the case were such positive excursions were reduced prior to transmitting this provides better duplication of the original output signal to its prior to reducing the extent of the larger positive excursions.

Preferably, the post-processor also includes post-compensator apparatus to compensate for distortions in the input signal. The post-compensator apparatus includes a filtering circuit for filtering out second order distortions from the input signal when critical carrier frequencies in the input signal are limited to a range of one octave. The filtering circuit may also be adapted for filtering out fourth order distortions from the input signal when the carrier frequencies in the input signal are limited to a range of half an octave.

Preferably, the post-compensator apparatus includes a linearizing circuit to distort the input signal to compensate for distortions in the input signal. The linearizing circuit is preferably an in-line linearizing circuit so that it can operate at very high frequencies. The linearizing circuit may include apparatus for removing odd order distortions due to modulating laser beam with the input signal and for removing odd order distortions due to receiving the input signal from the laser beam with the photo-detector, and amplifying the input signal such as a preamplifier and power amplifier in the receiver. The linearizing circuit may also include apparatus for removing at least part of the odd order distortion due to transmitting the laser beam through optical fiber. This may be necessary in a system such as a CATV system, in which the same signal is sent to multiple nodes at different distances so that part of the distortion due to transmission through the fiber varies between receiving nodes.

An optical receiver of the invention is defined by the post-processor together with an optical detector for converting the input laser beam into an electronic input signal and apparatus for directing the input laser beam from the optical fiber onto the optical detector. The post-processed input signal is directed into the other node through an output of the receiver.

Preferably, the optical detector is based on a PIN photo-diode, and the input optical signal is directed onto the photo-diode an optical lens system through which the laser beam travels between an optical fiber and the optical detector. The receiver includes a preamplifier after the optical detector which is followed by the post-shaper and a post-compensator. A power amplifier is preferably positioned after the post-shaper and post-compensator to minimize the power dissipated by those components.

The apparatus for directing the laser beam onto the optical detector may be, another lens system or possibly a direct connection, and the optical detector may be a PIN photo-diode. The detector converts the optical information signal carried by the laser beam into an input electronic information signal.

Those skilled in the art can understand the invention and additional objects and advantages of the invention by studying the description of preferred embodiments below with reference to the following drawings that illustrate the features of the appended claims:

DETAILED DESCRIPTION OF THE PREFERRED EMBODIMENTS

Figure 1:
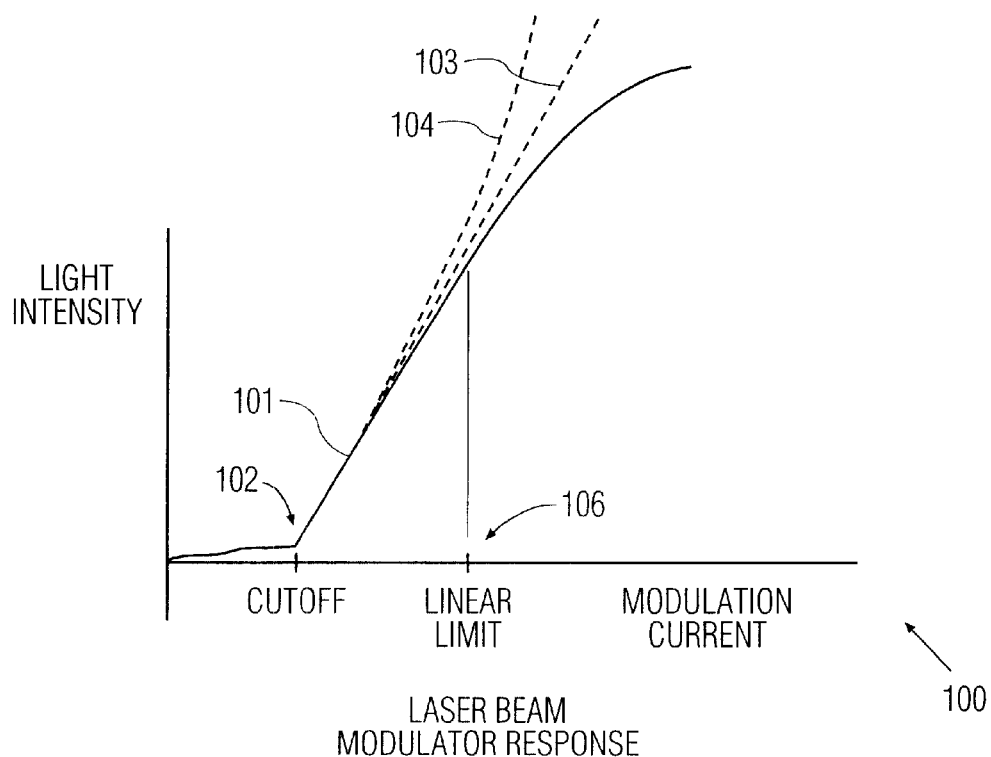
FIG. 1 illustrates the well known modulation response of a direct modulation distributed feedback laser.

FIG. 1, is a graph 100 illustrating the illumination level curve 101 of a distributed feedback (DFB) laser to variations in the input current level. Light is only generated only in response to a positive current. If the current is below a cutoff level 102 the light intensity quickly drops to zero. At moderate current levels above the cut-off the response of the illumination level of the laser to variations in current is approximately linear. At higher levels the illumination response deviates from a linear response shown as dashed line 103 as shown or possibly as illustrated by dashed curve 104. Therefore, the DFB laser is usually operated below a linear limit 106.

Figure 2:
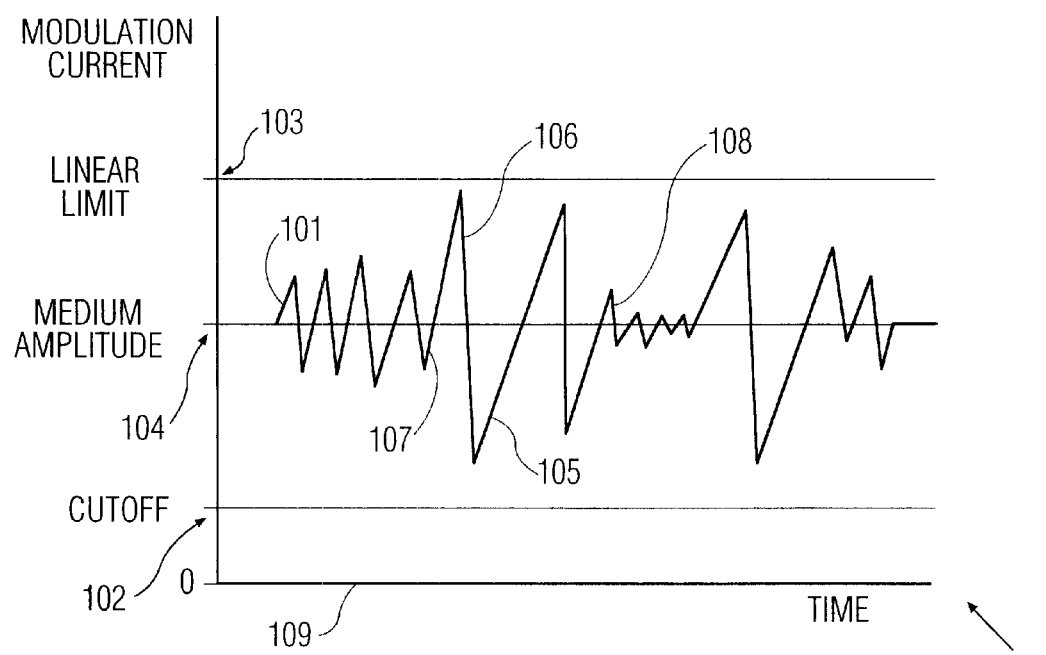
FIG. 2 illustrates a well known modulation signals used to modulate such a distributed feedback laser.

FIG. 2 is a graph 110 illustrating a current signal 101 as a function of time for a typical modulation signal used to modulate a DFB laser, for example, in a cable television system. The signal may be, for example, a multicarrier AM-VSB, 256-QAM, or a QSK signal. Signal 101 varies in amplitude at a high frequency between the cutoff limit 102 and linear limit 103 of the DFB laser. To achieve this, the medium amplitude of the signal must be biased at a positive value 104 between the cutoff and linear current limits. The signal includes negative excursions 105 and positive excursions 106 that are large in relation to most excursions represented by spikes 107 and 108. The amplitude of the signal must be limited so that information represented by large negative excursions is not lost or information represented by large positive excursions becomes extremely distorted so that the information is corrupted.

The modulation index is the energy represented by the unbiased signal (the area between curve 101 and the medium 104) divided by the energy of the biased signal (the area between curve 101 and the zero current line 109. It has been shown that the signal to noise ratio (SNR) is approximately proportional to the modulation index. As described above, it if very important to be able to achieve the highest SNR possible in the optical communication link in many systems such as in cable television, so that, the modulation index needs to be maximized.

Figure 3:
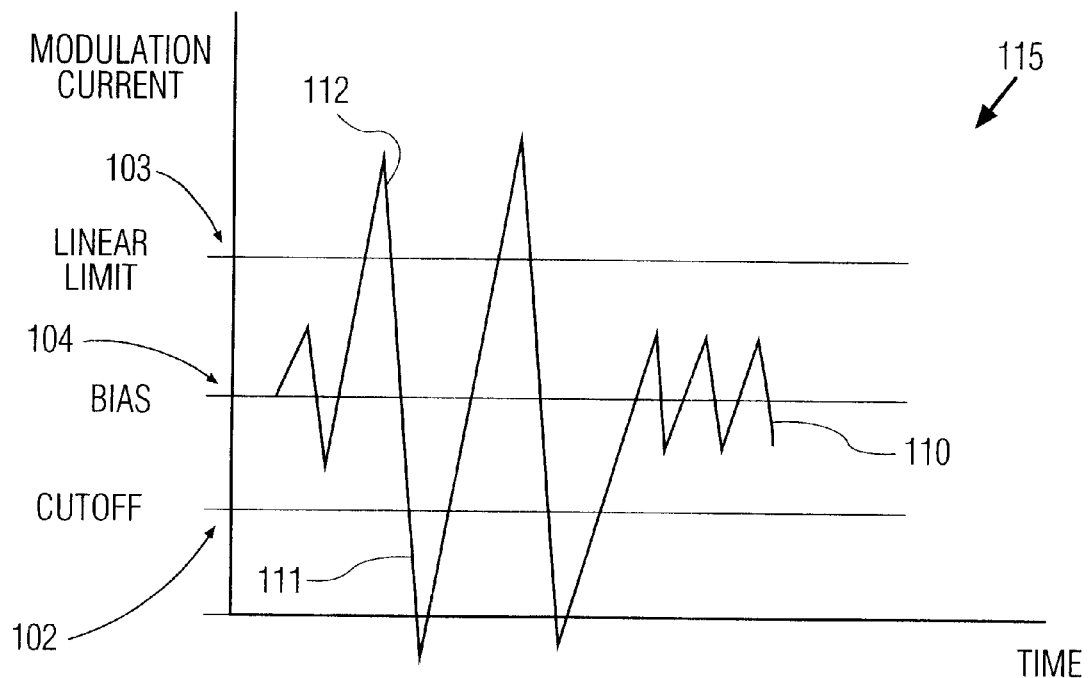
FIG. 3 illustrates a modulation signal with a higher modulation index, but which includes excursions above the linear limit and below the cutoff limit of the laser.

FIG. 3 illustrates a portion of modulation signal 110 with a larger amplitude than signal 101 of FIG. 2, so that the modulation index is higher. However, since part of the signal at 111 is below the cutoff current of the laser, that part will be lost resulting in communication errors. Also, since part of the signal at 112 is above the linear limit the laser will so distort the signal that additional communication errors will result.

Figure 4:
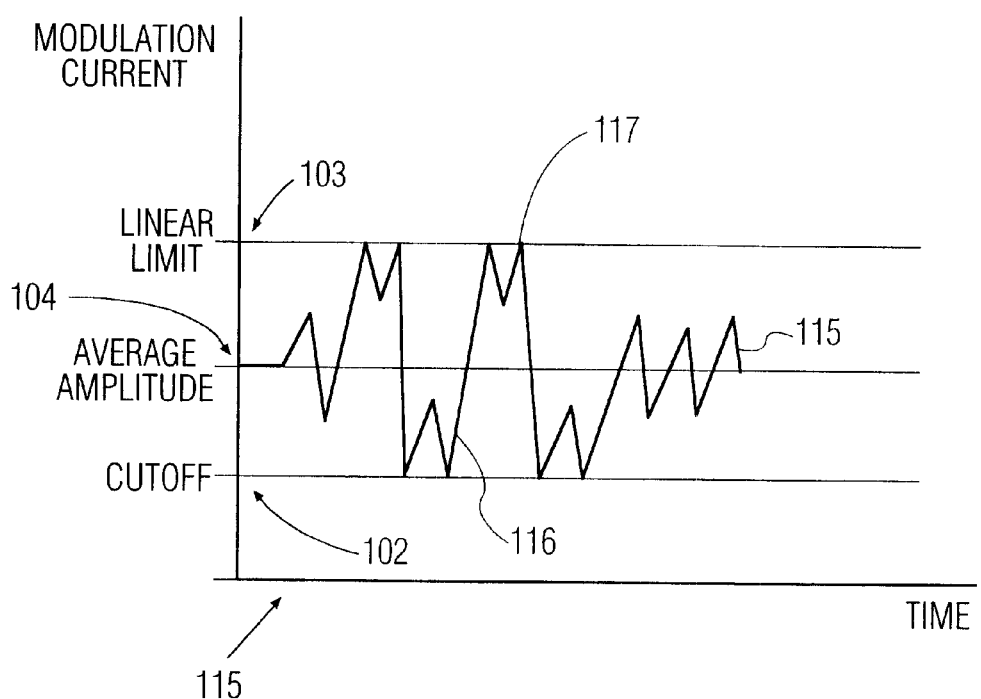
FIG. 4 illustrates an embodiment of the modulation signal of the invention with reduced excursions.

FIG. 4 illustrates a portion of the signal 115 of an example embodiment of the invention, in which large negative excursions have been reduced with respect to other excursions, without loss of information, so that, the modulation signal is increased. Preferably large positive excursions are also reduced with respect to smaller excursions, as shown. Notice that only the larger excursions have been reduced, and the smaller excursions are not affected. The reduction of the large negative and positive excursions is accomplished in the example herein, by inverting the change in amplitude of the signal below the cutoff limit at 116, and above the linear limit at 117. At the receiver the inversion of the signal can be reversed so that the output signal has the shape of signal 110 of FIG. 3.

The same input signal was provided in FIG. 3 and FIG. 4 with the same amplitude and the same bias, but the signal in FIG. 4 has been processed so that the larger positive and negative excursions have been reduced in relation to the other excursions. Thus information loss in the modulation signal of FIG. 4 will be prevented.

Figure 5:
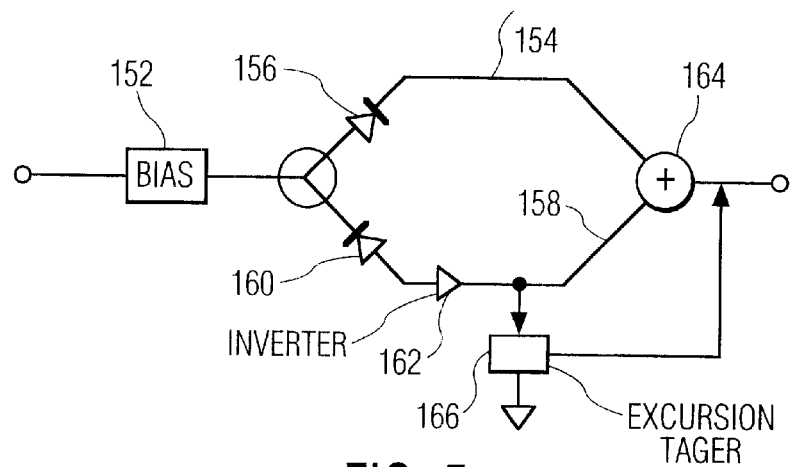
FIG. 5 shows an example circuit for converting the modulation signal of FIG. 3 into the modulation signal of FIG. 4.

FIG. 5 illustrates an example pre-shaper circuit to provide the parabolic transfer function for large negative excursions. In the case where positive excursions are also inverted a similar pre-shaper circuit could be provided in parallel or more preferably in series to provide the parabolic transfer function for the large positive excursions. Those skilled in the art could easily provide other similar circuits for pre-shaping or a single circuit for pre-shaping both positive and negative excursions. Biaser 152 biases the input signal so that the amplitude is positive except for the large negative excursions. Branch 154 of the circuit contains a forward oriented diode 156 to allow only the positive portion of the signal through that branch. Branch 158 contains a reverse oriented diode 160 to allow only the large negative excursion through that branch. Inverter 162 inverts the large negative excursions as shown for the large negative excursion 116 in FIG. 4. The positive part and inverted large negative excursion are recombined at adder 164. The circuit produces a slight delay in the negative excursions which can be recognized at the receiver for restoring the signal to its original condition before it was pre-shaped. Alternately, a marker signal may be provided by generator 166 to indicate the position of the large negative excursion.

Figure 6:
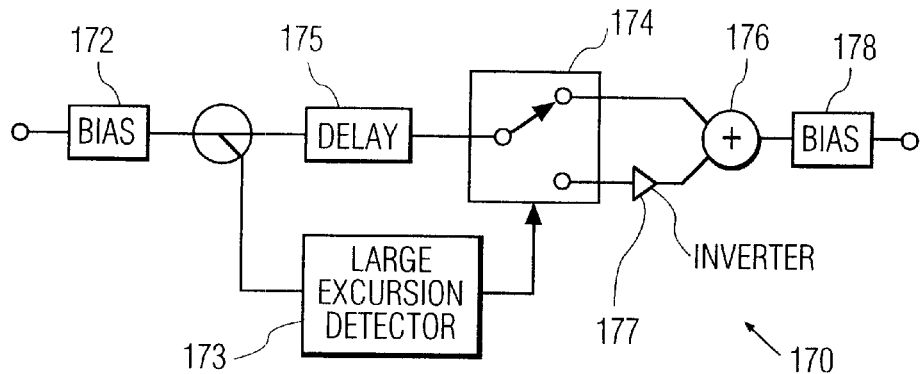
FIG. 6 shows an example circuit for converting the modulation signal of FIG. 4 back into the modulation signal of FIG. 3.

FIG. 6 shows an example post-shaper circuit for post-shaping the modulation signal so that large negative excursions are no longer inverted. Biaser 172 biases the signal so that the inverted large negative extensions extend to approximately zero current. A large excursion detector 173 determines which parts of the signal are inverted large negative excursions. The detector controls a switch 174 which routs portions of the signal that are not large negative excursions to adder 176; and routs portions of the signal that are inverted large negative extensions through inverter 177 to the adder 176. The signal output from the adder is approximately a duplicate of the input signal provided to the biaser 152 in FIG. 5. Biaser 178 biases the signal as required for further processing, for example, with the average amplitude of zero current.

Figure 7:
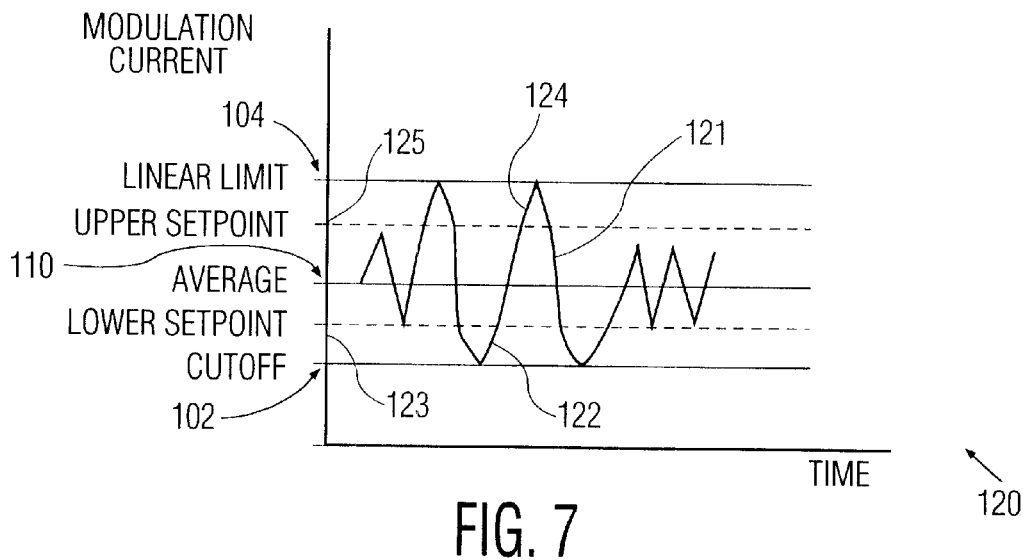
FIG. 7 illustrates another embodiment of the modulation signal of the invention with reduced excursions.

FIG. 7 depicts another example embodiment 120 of the modulation signal 121 of the invention with reduction of only large excursions, in which large negative inversions 122 have been truncated below set point 123 and large positive inversions 124 have been truncated above upper current set point 125 rather than inverted. Those skilled in the art will know how to modify the circuits of FIGS. 5 and 6 to provide such a signal. The resulting signal will result in higher distortions in the laser than the signal of FIG. 4, but the detection of the excursions becomes simpler.

Figure 8:
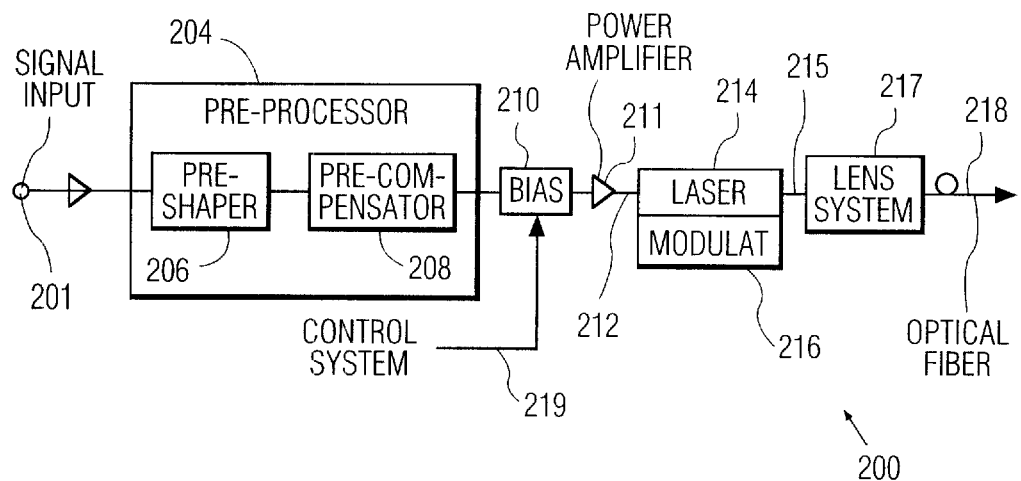
FIG. 8 illustrates an embodiment of the laser transmitter of the invention.

FIG. 8 illustrates a laser transmitter 200 of the invention. An electronic output signal is provided at connection 201, having high frequency positive and negative excursions in amplitude with respect to an average amplitude with the extent of some excursions being larger than other excursions. Preferably, the output signal is a multi-carrier signal including a multitude of carrier signals each of a different frequency and each modulated by a respective baseband information signal. The signal may be amplified if required for signal processing by preamplifier 202. Preprocessor 204 modifies the signal for enhanced transmission as an optical signal through an optical fiber. The preprocessor includes pre-shaper 206 for transforming the output signal including reducing the extent of the larger negative excursions with respect to the other excursions in the signal so as to increase the modulation index. The transformation is selected to minimize third order distortions due to using the output signal to modulate a laser beam and due to transmitting the modulated laser beam through an optic fiber, and may be a parabolic function such as that provided, for example, by the circuit of FIG. 5. The transforming also includes reducing the extent of larger positive excursions with respect to the other excursions in the output signal so as to further increase the modulation index and further reduce distortion and noise resulting from modulating the laser beam. The preprocessor may also include a pre-compensating circuit 208 for compensating for distortions in the system. Biaser 210 biases the average amplitude of the output signal so that a minimum amplitude of the output signal is higher than a predetermined minimum positive amplitude. Power amplifier 211 amplifies the signal as required for modulating a laser. Laser 214 produces a laser beam 215 modulated by modulator 216. Output directing apparatus 217 such as a lens system directs the laser beam into a proximate end of an optical fiber 218.

Preferably laser 214 and modulator 216 form an integral directly modulated laser. The laser may be a distributed feedback (DBF) laser.

Preferably, the predetermined minimum positive amplitude provided by biaser 210 corresponds approximately with the minimum cutoff amplitude of the directly modulated laser. The bias of the output signal depends on a bias control signal 219 that depends on parameters of the optical signal.

Figure 9:
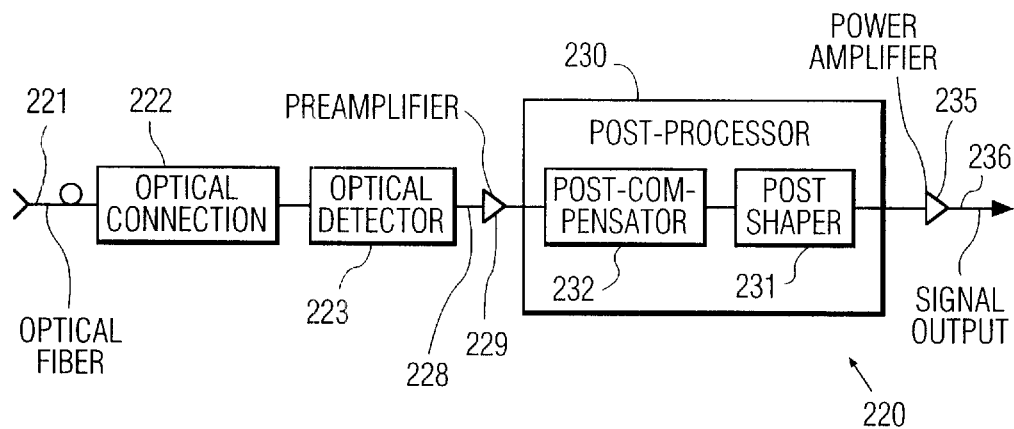
FIG. 9 illustrates an embodiment of the optical receiver of the invention.

FIG. 9 illustrates an optical receiver 220 of the invention. The receiver is located remote from the optical transmitter of FIG. 8 and optical fiber 218 communicates with optical fiber 221 to provide the optical signal. The optical signal from the laser transmitter of the invention is directed from optical fiber 221 by input apparatus 221, to optical detector 223 which converts the input laser beam into a high frequency electronic input signal having high frequency positive and negative excursions in amplitude with respect to an average amplitude with the extent of some excursions being larger than other excursions. Preamplifier 229 amplifies the input signal sufficient for post-processing, and post-processor 230 modifies the input signal to approximately duplicate the input signal at 201 in FIG. 8. The post-processor includes post-shaper 231 which reforms the input signal to reverse the effect of the pre-shaper in FIG. 8. A power amplifier 235 prepares the post-processed signal for distribution through output 236.

The input apparatus 222 may be an optical lens system or a simple mechanical device to hold the end of the optical fiber in relation to the photo-detector. The photo-detector 223 may be, for example, a PIN photo-diode.

Figure 10:
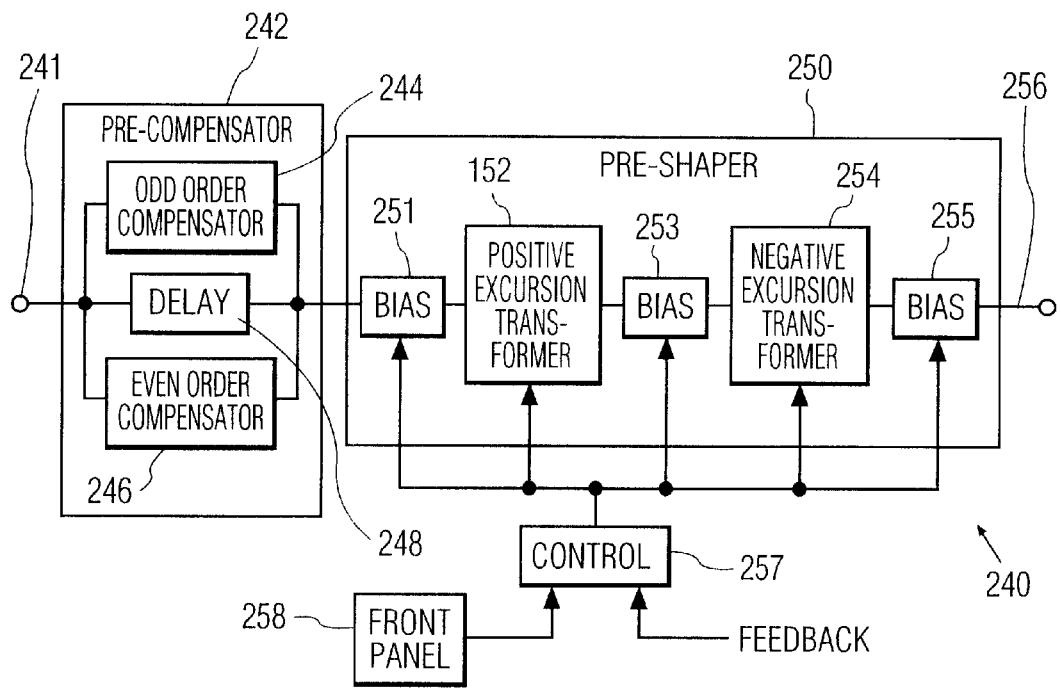
FIG. 10 illustrates an embodiment of the preprocessor of FIG. 8.

FIG. 10 illustrates a more detailed embodiment of the pre-processor 240 of the invention. The electronic multi-carrier input signal is received at node 241. Pre-compensator 242 distorts the input signal to compensate for distortions which occur in the signal later as the signal travels through the communication system. The pre-compensator includes an odd order compensator 244 and an even order compensator 246. A delay 248 delays the input signal for the time required for the even and odd order compensators to provide compensation signals which are added to the input signal. This is a parallel arranged pre-compensator, and an in-line pre-compensator will be discussed below with regard to FIG. 12.

Odd order compensator 244 compensates for odd order distortion due to dispersion when transmitting the laser beam through an optical fiber and due to using the output signal to modulate a laser beam. Even order compensator 246 may be used to reduce higher even order distortions, such as sixth order and higher even order distortions, due to using the output signal to modulate the laser beam and due to transmitting the modulated laser beam through an optical fiber. Finally, the compensators may be used for compensating for odd and even order distortions due to receiving the output signal from the modulated laser beam with a photo-detector and due to amplifying the output signal. Such amplification may include electronic amplification prior to the pre-compensator, in the transmitter after the pre-compensator, and at the receiver. Also, such amplification may include optical amplification using for example, a pumped doped fiber amplifier.

The pre-shaper 250 applies the transformations to the input signal which increases the modulation index. Bias 251 and positive excursion transformer 152 reduce the larger positive excursions. Bias 253 and negative excursion transformer which reduce the large negative excursions of the input signal. Bias 255 adjusts the bias for laser modulation. In this embodiment the pre-shaper circuits are in-line circuits.

Control 257 provides signals to adjust the parameters of the pre-shaper depending an regulation signals, such as, a signal from a front panel 358 or a feedback signal from a local or remote receiver 220 in FIG. 9. The feedback signal depends on the parameters of the optical signal that is received by the receiver. For example, the cutoff and lower limits of the signal shown in FIG. 4 can be adjusted to match the particular laser by adjusting the biases 251, 253, and 255. The upper and lower set point and steepness of truncation of the signal in FIG. 7 can be adjusted by adjusting the biases and the inverters of FIGS. 5 and 6.

Figure 11:
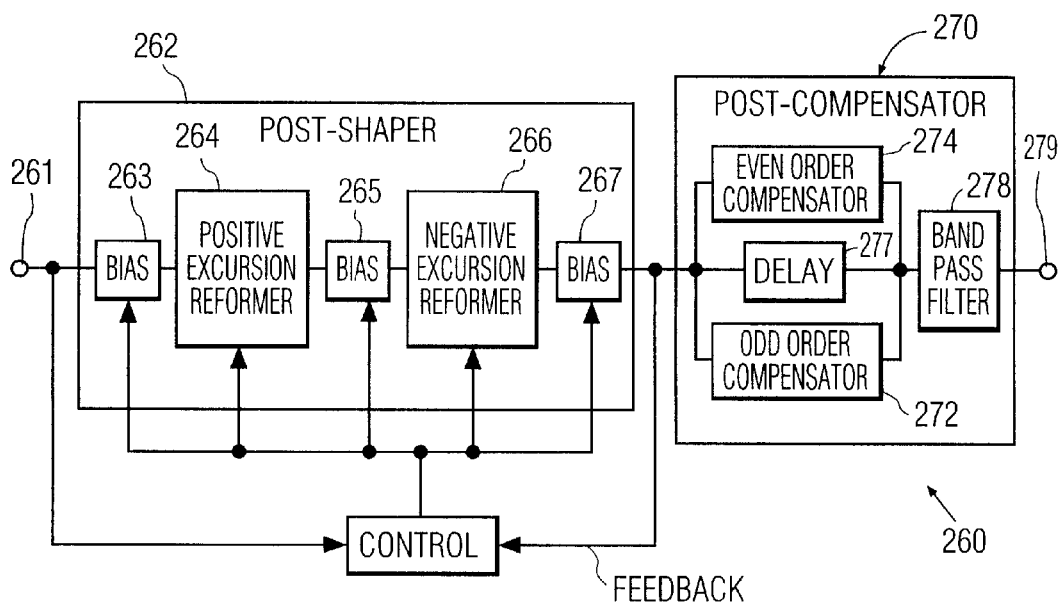
FIG. 11 illustrates an embodiment of the post-processor of FIG. 9.

FIG. 11 illustrates a more detailed embodiment of the post-processor 260, of the invention. The electronic multi-carrier output signal is received at connection 261. Post-shaper 262 applies the transformations to the output signal which restores the signal to its shape prior to its transformation by the pre-shaper, so that, the transformation applied by the pre-shaper is reversed. Bias 263 and positive excursion reformer 246 restore the positive and bias 265 and negative excursion reformer 266 restore the negative excursions to their amplitudes relative to smaller excursions in the input signal at 201 in FIG. 8. Bias 267 adjusts the signal to the level required for further signal processing and distribution, for example, by setting the average amplitude at zero current.

Post-compensator circuit 270 includes odd order compensator 272 and may also include even order compensator 274. The embodiment shown is a parallel arrangement in which the compensation current is generated in a branch line which is added to the input current to provide compensation. Delay 277 is provided to provide the same delay in the input current that is required to generate the distortion signals in the compensators. The post-compensator may compensate for odd order and higher even order distortions due to the components of the receiver which distort the signal such as the optical detector, preamplifier and the power amplifier which follows the post-compensator. In addition the post-compensator may be required to compensate for part of the odd order and higher even order distortions due to transmitting the optical signal through different lengths of optical fiber. That is, when a signal is transmitted to more than one node through different optical paths and the paths have different lengths, then pre-compensation can not compensate for the different distortions in the different paths, and post-compensation may be required.

Post-compensation circuit 270 also includes band pass filter 278 to filter out distortions. The transforming of the signal induces second order distortion of the output signal during transmission through an optic fiber. Thus, preferably, the frequencies of carriers for critical signals in the output signal are within a range of one octave, from a minimum f1 to a maximum f2 and f2<2*f1, so that second order distortion can be filtered out after optical fiber transmission. Also, the transforming induces fourth order distortion of the output signal during transmission through an optical fiber, and preferably, the frequencies of carriers for critical signals in the output signal are within a range of half an octave, from a minimum f1 to a maximum of f2 and f2<1.5*f1, so that fourth order distortion can be filtered out after optical fiber transmission. Also, the carrier frequencies of critical signals are between approximately 550 and 750 MHz, so that, the frequency band can carry 33 channels with 6 MHz width.

Figure 12:
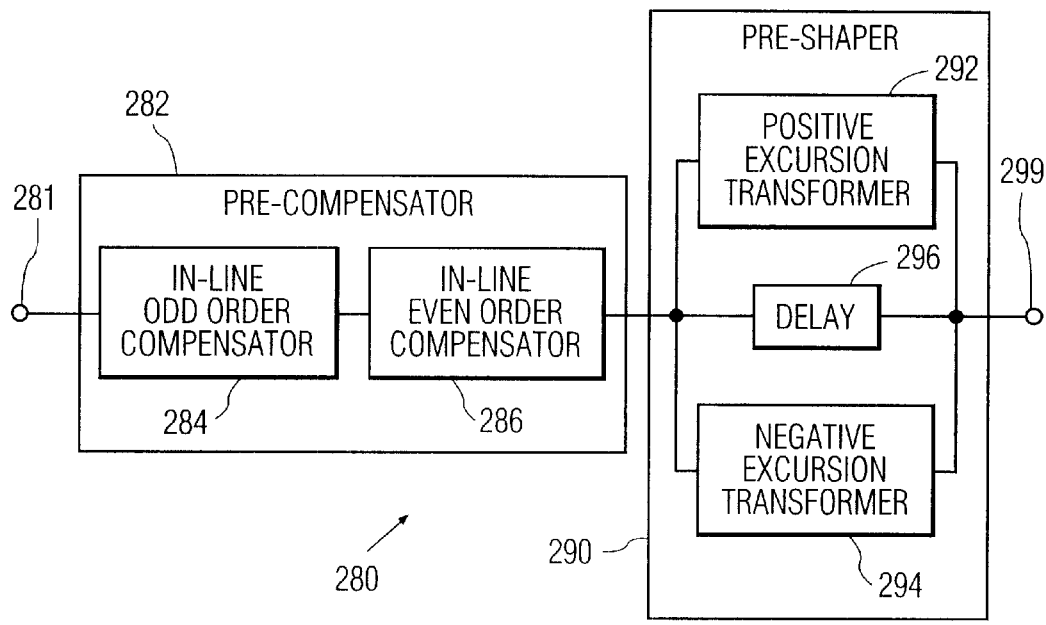
FIG. 12 illustrates another embodiment of the preprocessor of FIG. 8.
Figure 13:
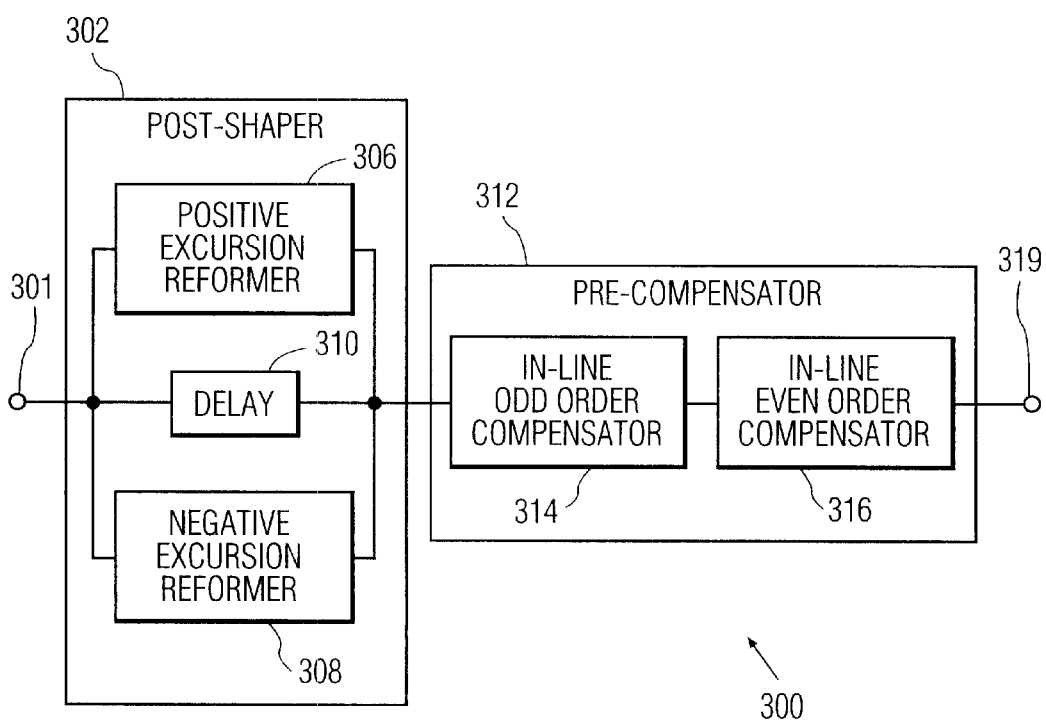
FIG. 13 illustrates another embodiment of the post-processor of FIG. 9.

FIGS. 12 and 13 illustrate alternative embodiments to the pre-processors and post-processors of FIGS. 10 and 11 respectively. FIG. 12 includes a pre-compensator with in-line odd order compensator 284 and in-line even order compensator 286. In line refers to the fact that these are serial arrangements in which distortion signals generated directly in the input signal path. Pre-shaper 290 is a parallel arrangement in which positive excursion transformer 292 and negative excursion transformer 294 generate signals in branch lines which are added to the input signal to accomplish the transforming and a delay line is provided to delay the input signal by the time required to generate the transformation signals.

Figure 14:
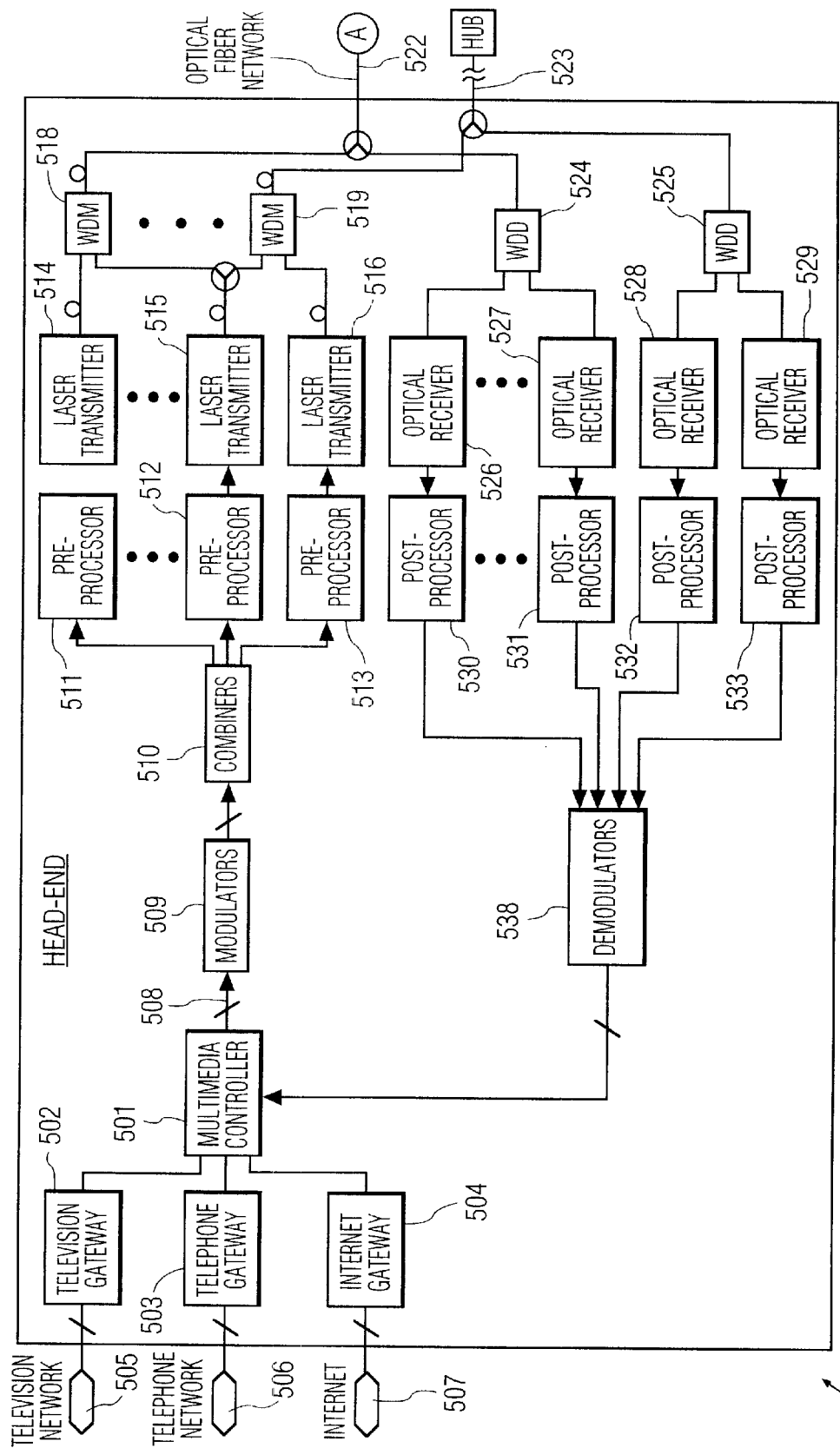
FIG. 14 illustrates a head-end of a cable television network of the invention.
Figure 15:
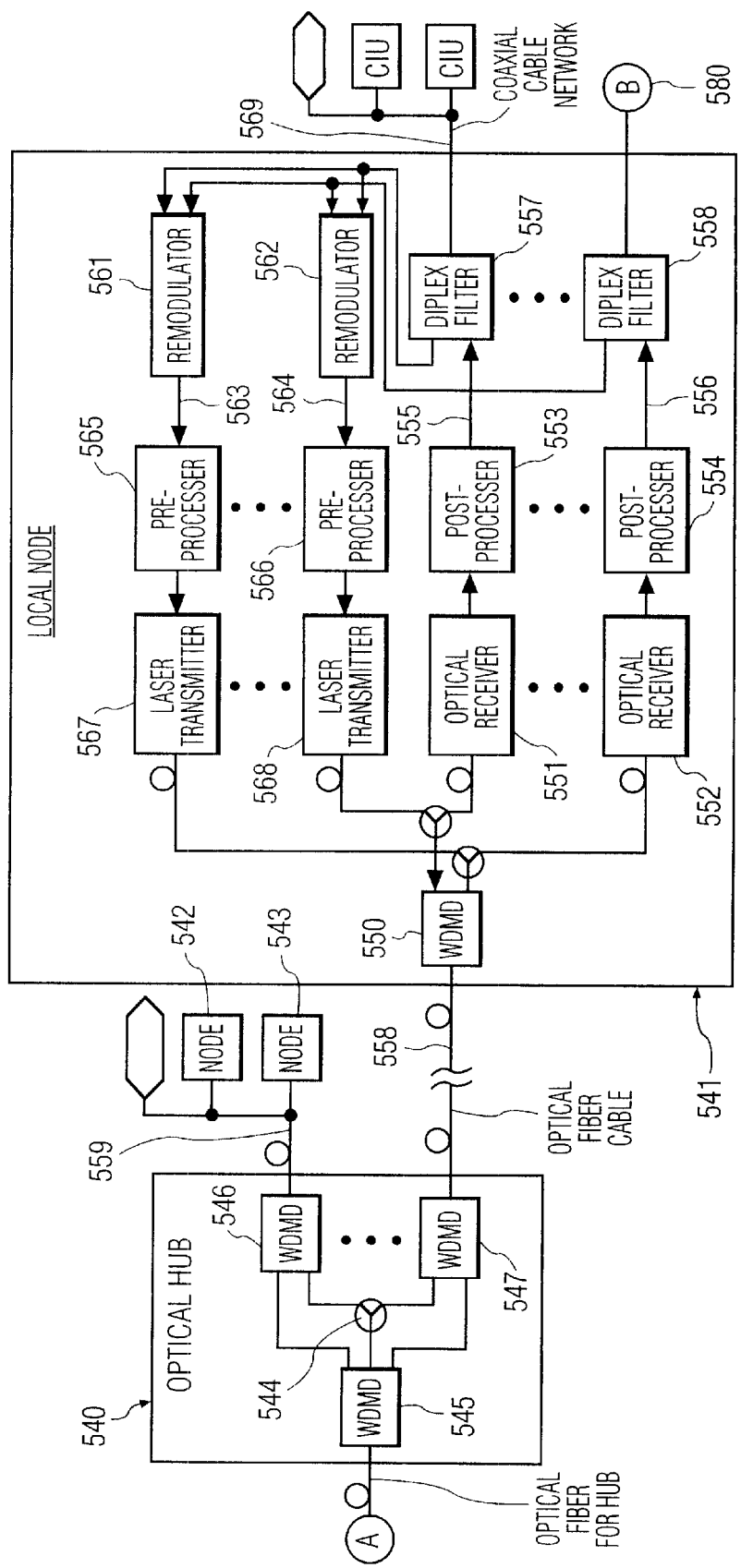
FIG. 15 illustrates an optical hub and nodes of the cable television network embodiment of FIG. 14.
Figure 16:
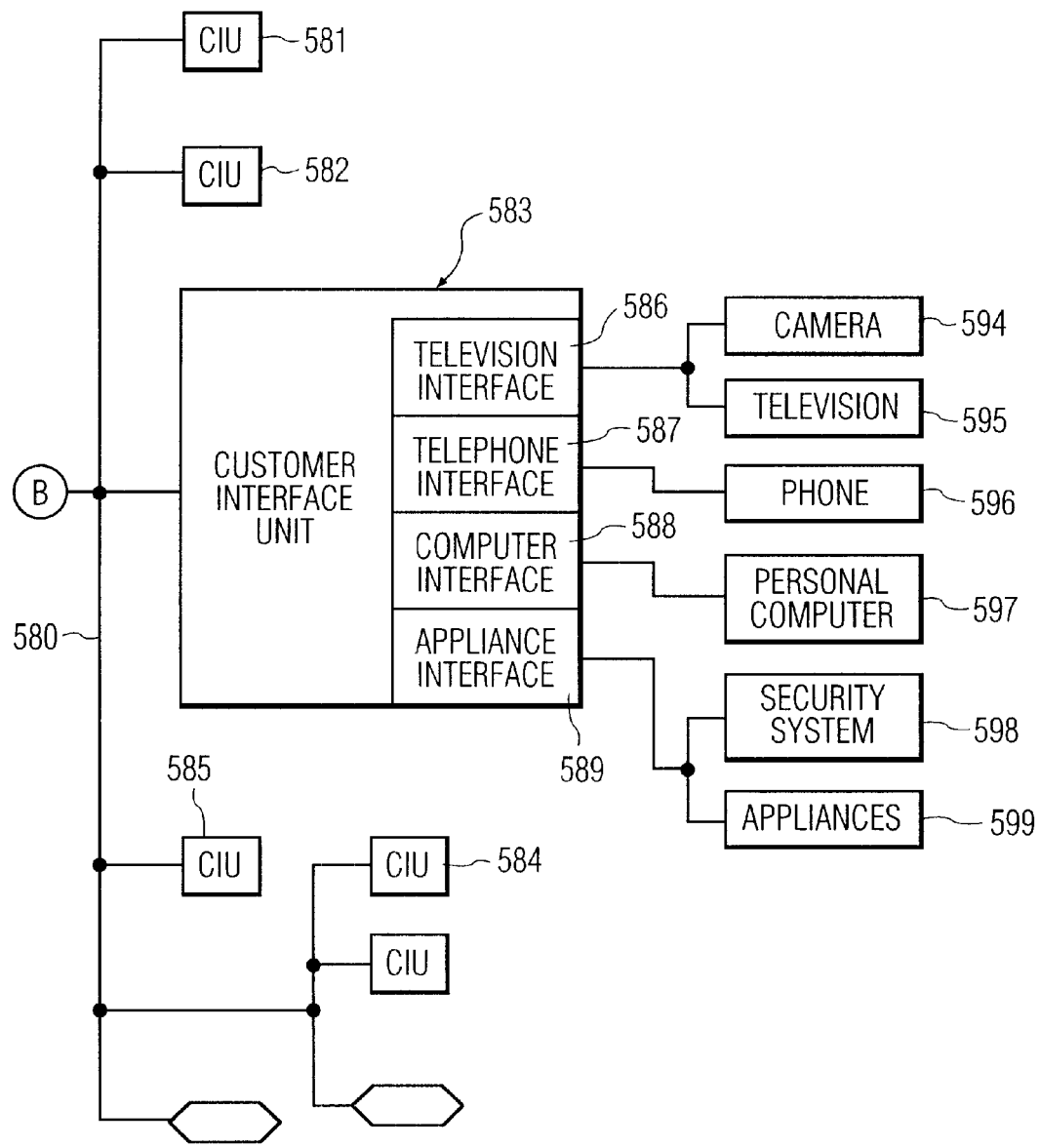
FIG. 16 shows customer interface units of the cable television network embodiment of FIG. 14.

FIGS. 14–16 illustrate an example embodiment of the broadband communication system of the invention. In FIG. 14, a head-end 500 includes a multimedia access controller 501 communicating with a telephone gateway 502, a computer gateway 503, and a television gateway 504. The telephone gateway provides telephone communications with the telephone network so that customers connected to the broadband system can communicate by telephone with persons or computer systems which are connected to the telephone network outside of the broadband system. The computer gateway provides high speed communications with computer systems such as the internet. The telephone gateway can also be used for lower speed access to such computer systems. The television gateway receives television programs, for example, by satellite download from television studios. In addition, the gateway may provide television programs from one of the broadband system customers for up-link for distribution outside of the system. The television gateway may also provide interactive television for customers of the broadband network.

Electronic information signals are routed from the access controller to modulators 509 which modulate carrier signals of different frequencies with respective information signals. The modulated signals are combined by combiners 510 to provide a multi-carrier output signal. The modulators and combiners may be discrete or integrated into single circuits as shown. The multi-carrier modulated output signal is then routed to preprocessors 511–513 of the invention where large negative excursions are reduced so that the modulation index can be increased. The preprocessed output signals are routed to laser transmitters 514–516 where the preprocessed signals modulate respective laser beams of respective lasers to produce respective optical information output signals. The optical information output signals are routed to wavelength division multiplexers (WDMs) 518–519 which combine the laser beams into common optical fibers 528, 529 and transmit them to respective hub described below. Wavelength division demultiplexers (WDDs) separate optical input signals received from the hubs from common optical fibers 522 and 523, and rout the optical signal to optical receivers 526–529 which convert the received optical input signals into respective electronic information input signals. The received electronic input signals are routed to post-processors where larger negative excursions are increased with respect to other excursions of the input signal. Then the input signals are routed to separator-demodulator 525 which convert the input signals to base band signals. The base band signals are touted to multimedia controller 501 where they are used to control the access controller or are provided to the correct gateway for information communication.

FIG. 15 shows a hub 540 connected to local nodes 541–543. The hub includes a common wavelength division multiplexer/demultiplexer (WDMD) 545 for communication through a common fiber to the head-end. The common WDMD communicates with respective WDMD's 546–547 for each local node connected to the hub.

Local nodes 541–543 may be identical, but relevant details are only shown for local node 541 for simplicity of drawing and description. Local node 541 includes a WDMD 550 for the local node. WDMD 550 separates optical signals according to light wavelength. The separated optical signals are routed to optical receivers 551–552 which convert the optical signals to forward electronic signals. The forward electronic signals are routed to post-processors 553 which increase the amplitude of larger negative excursions with respect to other excursions of the input signal to reverse the pre-shaping of preprocessors 511–513 of FIG. 14. The forward electronic signals are then transmitted through coaxial cable tree networks (369–580) to customer interface units of FIG. 15, described below.

In the local node, return signals from the customer interface units are separated from the forward signals in the coaxial cable networks by respective diplex filters 557–558. The diplex filters may be pass band filters where the return signals have frequencies within a different band than the forward signals. The return signals are modulated multi-carrier signals from the customer interface units described below. The separated electronic return signals are routed to preprocessors 565–566 for reducing the extent of larger negative excursions of the return for increasing the modulation index. Laser transmitters 567–568 produce respective laser beams which are modulated by respective return signals. The laser beams have different optical wavelengths and are routed to WDMD 550 for combination into common fiber 558 for transmission back through hub 540, and then back to head-end 500.

FIG. 16 illustrates a coaxial tree network 580 for routing signals between the local node shown in FIG. 15 and customer interface units 581–585. Each customer interface unit contains interfaces for connecting between the coaxial cable network and a respective customer's television network 594, 595, computer network 597, telephone network 596, and appliance network 598, 599.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A signal pre-processor for laser communications, comprising:

a source of an output signal, the output signal having high frequency positive and negative excursions in amplitude with respect to an average amplitude, with an extent of some excursions being larger than other excursions;

a preshaper that is configured to transform the output signal, including reducing the extent of larger negative excursions with respect to other excursions in the output signal, to produce therefrom a transformed signal that includes a transformed portion of the larger negative excursions that facilitates a reconstruction of the larger negative excursions at a receiving system, so as to increase a modulation index associated with a modulation of the output signal;

a bias device that is configured to bias an average amplitude of the transformed signal by approximately a minimum amount required, to produce therefrom a biased transformed signal so that an amplitude of the biased transformed signal during negative excursions does not fall below a predetermined minimum positive amplitude, to produce therefrom a biased and transformed output signal that is suitable for modulating a laser beam to produce therefrom a modulated laser beam.

2. The pre-processor of claim 1, in which:

the output signal is a multi-carrier signal including a multitude of carrier signals each of a different frequency and each modulated by a respective baseband information signal; and, the pre-processor further includes a pre-processing stage that is configured to minimize one or more odd-order distortions due to using the biased and transformed output signal to modulate the laser beam, and due to transmitting the modulated laser beam through an optic fiber.

3. A laser transmitter, using the pre-processor of claim 1, comprising:

a laser for producing the laser beam; and a modulator that is configured to modulate the laser beam with the biased and transformed output signal to provide a modulated laser beam; and wherein the modulator is configured to provide the modulated laser beam to an optical fiber.

4. The laser transmitter of claim 3 in which:
the laser includes a directly modulated laser so that the laser and the modulator are integral;
the predetermined minimum positive amplitude corresponds approximately with a cutoff amplitude of the directly modulated laser;
the laser includes a distributed feedback type laser diode;
the biased output signal depends on a feedback signal that depends on parameters of the modulated laser beam;
the laser transmitter further comprises
an amplifier that is configured to amplify the biased and transformed output signal that is provided to the modulator; and
an optical lens system through which the modulated laser beam travels between the laser and the optical fiber.

5. A cable television network, using the laser transmitter of claim 3, comprising:
a network of optical fibers; and
a head-end of the network, including:
gateway means for information signal communication with other networks including: a television network for receiving television programs; a telephone network for receiving and transmitting telephone communications; and a computer network for receiving and transmitting computer data;
signal modulator means for modulating the received information signals with carrier signals;
forward combiner means for combining the modulated information signals into one or more electronic forward signals, each forward signal including a multitude of modulated signals each with a different respective carrier frequency, the forward signals having high frequency positive and negative excursions in amplitude with respect to an average amplitude with some excursions being larger than other excursions;
respective pre-shaper means for each forward signal to transform the forward signal, including reducing the amplitude of the larger negative excursions with respect to the other excursions in the signal so as to increase the modulation index;
respective bias means for each forward signal to bias the forward signal so that a minimum amplitude is always higher than a predetermined minimum positive amplitude;
a respective laser for each forward signal, for producing a respective forward laser beam with a predetermined wavelength of light;
respective optical modulation means for modulating each forward laser beam with a respective biased transformed electronic forward signal to convert the electronic signal to a corresponding optical signal; and
a respective optical lens system for each laser, for directing the modulated forward laser beam into a proximate end of a respective one of the optical fibers;
a respective optical detector for each of one or more optical return signals, for converting the optical return signals into corresponding electronic return signals;
a respective optical system for directing respective optical return signals from ends of one or more of the optical fibers to corresponding optical detectors;
means for providing the electronic return signals to the gateway means for transmitting the return signals as telephone communications and computer data;
and in which the cable television network further comprises:
a multitude of separate coaxial cable network trees, and
a plurality of local nodes, each connected to one or more of the optical fibers and one or more of the coaxial cable network trees, and each including:
a respective optical detector for each forward optical signal received by the node for converting optical forward signals into corresponding electronic forward signals having high frequency positive and negative excursions in amplitude with respect to an average amplitude with some excursions being higher than other excursions;
respective input means for each optical detector for directing a laser beam carrying the optical signal from an end of a respective optical fiber to the optical detector;
means for reforming the electronic forward signal to approximately duplicate the electronic forward signal prior to transforming the forward signal to increase the modulation index;
means for providing the electronic forward signal to one or more of the coaxial cable network trees;
a respective diplex filter for separating local return electronic signal from the forward electronic signal in each coaxial cable network tree;
return processor means for processing the local return electronic signals to provide one or more processed electronic return signals;
a respective laser for each processed return signal, for producing a respective return laser beam with a predetermined wavelength of light;
a respective optical modulation means for modulating each return laser beam with a respective processed electronic forward signal to convert the processed electronic signal to a corresponding optical signal; and
a respective optical lens system for each laser, for directing the modulated return laser beam into a proximate end of a respective one of the optical fibers;
and in which the cable television network further comprises:
a multitude of customer interface units connected to the coaxial cable network trees for receiving the electronic forward signals and for transmitting the return signals, including:
means for connecting a television display to the customer interface unit for displaying the television programs contained in the forward signals;
means for connecting telephone equipment to the customer interface units for receiving telephone communications from the forward signals and transmitting telephone communications in the return signals; and
means for connecting computer equipment to the customer interface unit for receiving computer data from the forward signals and transmitting computer data in the return signals.

6. The network of claim 5, in which:
the return processor means, includes:
upconverter means for demodulating a plurality of modulated signals in the local return signals from each diplex filter into a multitude of baseband signals, remodulating the baseband signals into respective modulated signals with different carrier frequencies; and combining the modulated signals to produce the processed return signals having high frequency positive and negative excursions in amplitude with respect to an average amplitude with some excursions being larger than other excursions;

respective pre-shaper means for each processed return signal to transform the return signal, including reducing the amplitude of the larger negative excursions with respect to the other excursions in the signal so as to increase the modulation index; and respective bias means for each return signal to bias the return signal so that a minimum amplitude is always higher than a predetermined minimum positive amplitude;

the head-end further includes:

signal demodulation means for demodulating the modulated return signals to provide a multitude of baseband return signals; and means for providing the electronic return signals to the gateway means provides the baseband return signals to the gateway means.

7. The signal-processor of claim 1, wherein:

the preshaper is further configured to reduce the extent of larger positive excursions with respect to the other excursions in the output signal so as to further increase the modulation index.

8. The signal-processor of claim 1, further including a pre-processing stage that is configured to minimize one or more even-order distortions due to using the biased and transformed output signal to modulate the laser beam.

9. The signal-processor of claim 1, further including a pre-processing stage that is configured to compensate for distortions due to receiving and amplifying the modulated laser beam with a photo-detector.

10. A signal post-processor, comprising:

a receiver that is configured to provide an input signal with positive and negative excursions in amplitude with respect to an average amplitude with an extent of some excursions being larger than other excursions;

a post-shaper that is configured to reform the input signal to approximately duplicate a previous signal prior to transforming the previous signal to provide a transformed signal having an increased modulation index, modulating a laser beam with the transformed signal to provide a modulated laser beam, transmitting the modulated laser beam through an optical fiber, and receiving the modulated laser beam via the receiver to provide therefrom the input signal, by increasing the extent of larger negative excursions with respect to other excursions.

11. The post-processor of claim 10 in which:

the input signal is a multi-carrier signal including a multitude of carrier signals each of a different frequency and each modulated by a respective baseband information signal;

the post-processor further comprises a post-compensator that is configured to compensate for distortions in the input signal, and includes:

a filtering circuit that is configured to filter one or more even-order distortions from the input signal; and a linearizing circuit that is configured to minimize odd order distortions from the input signal.

12. An optical receiver, using the post-processor of claim 10, wherein the receiver includes an optical detector that is configured to convert an input laser beam into the input signal.

13. The receiver of claim 12, in which:

the optical detector includes a PIN photo-diode;

the receiver includes an optical lens system through which the modulated laser beam travels between the optical fiber and the optical detector;

the receiver includes a preamplifier after the optical detector;

the preamplifier is connected prior to the post-shaper;

the receiver includes a power amplifier, the power amplifier is after the post-shaper;

the receiver includes a post-compensator; and the power amplifier is after the post-compensator.

14. A communication node, comprising:

a modulator that receives an output signal and provides therefrom a first modulated laser beam, and a demodulator that receives a second modulated laser beam and provides therefrom an input signal;

wherein the modulator includes a pre-shaper that is configured to transform large excursions of the output signal differently than smaller excursions of the output signal, to thereby increase a modulation index associated with the first modulated signal, and the demodulator includes:

a detector that converts the second modulated laser beam to an electronic signal, and a post-shaper that is configured to transform particular excursions of the electronic signal differently than other excursions of the electronic signal, to form the input signal.

15. A communication system, comprising:

a network of optical fibers;

a first node of the communication system, including:

a source that provides an electronic output signal having high frequency positive and negative excursions in amplitude with respect to an average amplitude with some excursions being larger than other excursions;

a pre-shaper that transforms the output signal to form a transformed output signal, including reducing the amplitude of larger negative excursions with respect to other excursions in the output signal so as to increase a modulation index;

means to bias the transformed output signal to form a biased and transformed output signal so that a minimum amplitude of the output signal is always higher than a predetermined minimum positive amplitude;

a laser that produces a laser beam; and a modulator that modulates the laser beam with the biased and transformed output signal to provide a modulated laser beam;

an output that directs the modulated laser beam into a proximate end of an optical fiber;

a second node of the communication system, including:

an optical detector for converting the modulated laser beam into a high frequency electronic input signal having high frequency positive and negative excursions in amplitude with respect to an average amplitude with some excursions being larger than other excursions;

an input that directs the modulated laser beam from the optical fiber to the optical detector;

a post-processor that reforms the high frequency electronic input signal to approximately duplicate the output signal.

16. A method of communication, comprising:

providing an electronic output signal having high frequency positive and negative excursions in amplitude with respect to an average amplitude with some excursions being larger than other excursions;

pre-shaping the output signal, including reducing the amplitude of larger negative excursions with respect to the excursions in the output signal, to provide a transformed output signal that includes a transformed portion of the larger negative excursions that facilitates a reconstruction of the larger negative excursions at a receiving system, so as to increase a modulation index;

biasing the transformed output signal to provide a biased transformed output signal, so that a minimum amplitude of the biased transformed output is always higher than a predetermined minimum positive amplitude;

producing an output laser beam;

modulating the output laser beam with the biased transformed output signal to form a modulated output laser beam; and directing the modulated output laser beam into a proximate end of an optical fiber; and transmitting the modulated output laser beam through the optical fiber.

17. The method of claim 16, further comprising:

directing a modulated input laser beam selected from the modulated output laser beam to an optical converter;

converting the input laser beam into a high frequency electronic signal having high frequency positive and negative excursions in amplitude with respect to an average amplitude with some excursions being larger than other excursions;

reforming the input signal to provide a reformed input signal that approximately duplicates the electronic output signal; and demodulating at least one carrier frequency of the reformed input signal to provide a baseband signal.

18. A method of preprocessing a signal to form a preprocessed signal for subsequent transmission, the method comprising:

comparing the signal relative to a limit value, to identify a large excursion of the signal, modifying the signal to form the preprocessed signal when the large excursion is identified, and copying the signal to form the preprocessed signal when the large excursion is not identified;

wherein modifying the signal increases a modulation index associated with the subsequent transmission.

19. The method of claim 18, wherein modifying the signal includes inverting the signal.

20. The method of claim 18, wherein modifying the signal includes truncating the signal.

21. A method of postprocessing a received signal to form a postprocessed signal, the method comprising:

detecting a duration corresponding to a large excursion of a signal that formed the received signal, forming the postprocessed signal via a transformation of the received signal during the duration corresponding to the large excursion, and forming the postprocessed signal directly from the received signal during durations that do not correspond to the large excursion to form the postprocessed signal.

22. The method of claim 21, wherein the transformation includes an inversion.

23. The method of claim 21, wherein the transformation includes reversing a truncation.

* * * * *